US012781009B2

(12) United States Patent
Speight et al.

(10) Patent No.: US 12,781,009 B2
(45) Date of Patent: Nov. 3, 2026

(54) PRE-CURED PRODUCT FOR THERMALLY EXPANDABLE COMPOSITIONS

(71) Applicant: SIKA TECHNOLOGY AG, Baar (CH)

(72) Inventors: Michael Speight, Hazel Park, MI (US); Leslie Wolschleger, Clarkston, MI (US); Braden Lanore, Sterling Heights, MI (US); Jena Mabilia, Bloomfield, MI (US)

(73) Assignee: SIKA TECHNOLOGY AG, Baar (CH)

( * ) Notice: Subject to any disclaimer, the term of this patent is extended or adjusted under 35 U.S.C. 154(b) by 891 days.

(21) Appl. No.: 17/798,253

(22) PCT Filed: Feb. 3, 2021

(86) PCT No.: PCT/EP2021/052567

§ 371 (c)(1),
(2) Date: Aug. 8, 2022

(87) PCT Pub. No.: WO2021/156315

PCT Pub. Date: Aug. 12, 2021

(65) Prior Publication Data

US 2023/0080499 A1 Mar. 16, 2023

(30) Foreign Application Priority Data

Feb. 7, 2020 (EP) .................................... 20156200

(51) Int. Cl.

| | |
|---|---|
| ***C08J 9/00*** | (2006.01) |
| ***C08J 9/10*** | (2006.01) |
| ***C08L 23/0853*** | (2025.01) |
| ***C08L 23/30*** | (2006.01) |

(52) U.S. Cl.

CPC ........... *C08J 9/0061* (2013.01); *C08J 9/0023* (2013.01); *C08J 9/103* (2013.01); *C08J 9/107* (2013.01); *C08J 2201/026* (2013.01); *C08J 2201/03* (2013.01); *C08J 2201/05* (2013.01); *C08J 2323/08* (2013.01); *C08J 2333/04* (2013.01)

(58) Field of Classification Search

CPC ........ C08J 9/0061; C08J 9/0023; C08J 9/103; C08J 9/107; C08J 2201/026; C08J 2201/03; C08J 2201/05; C08J 2323/08; C08J 2333/04; C08J 2303/04; C08J 2423/08; C08J 9/10; C08L 23/0853; C08L 2205/025; C08L 2205/08; C08L 91/06; C08K 5/14

See application file for complete search history.

(56) References Cited

U.S. PATENT DOCUMENTS

| | | | | |
|---|---|---|---|---|
| 4,952,428 A | | 8/1990 | Keogh | |
| 5,378,539 A | * | 1/1995 | Chen | C08K 3/22 524/436 |
| 2014/0131910 A1 | * | 5/2014 | Kohlstrung | C08J 9/103 521/89 |

FOREIGN PATENT DOCUMENTS

| | | | |
|---|---|---|---|
| DE | 10 2011 080 223 | A1 | 2/2013 |
| KR | 20150024741 | A | 3/2015 |
| WO | 2019/030107 | A1 | 2/2019 |
| WO | 2019/090067 | A1 | 5/2019 |
| WO | 2019/134842 | A1 | 7/2019 |

OTHER PUBLICATIONS

Mar. 18, 2021 Search Report issued in International Patent Application No. PCT/EP2021/052567.

Mar. 18, 2021 Written Opinion issued in Internation Patent Application No. PCT/EP2021/052567.

* cited by examiner

*Primary Examiner* — K. Boyle
(74) *Attorney, Agent, or Firm* — Oliff PLC

(57) ABSTRACT

A product, especially a master-batch for producing thermally expandable compositions, is obtainable or obtained by reacting, preferably by extruding, a mixture including: (a) at least one polymer P, cross-linkable by peroxide, and (b) at least one coagent, especially an acrylate A, and (c) at least one peroxide PE, wherein the mixture is reacted such that the product has an average melt flow index (MFI) of between 0.1 and 8 g/10 min.

13 Claims, 1 Drawing Sheet

PRE-CURED PRODUCT FOR THERMALLY EXPANDABLE COMPOSITIONS

TECHNICAL FIELD

The present invention relates to a product, especially a master-batch for producing a thermally expandable composition, wherein the product is obtainable or obtained by reacting, preferably by extruding, a mixture comprising: (a) at least one polymer P, cross-linkable by peroxide, and (b) at least one coagent, especially an acrylate A, and (c) at least one peroxide PE. Furthermore, the invention is concerned with a thermally expandable composition and with a baffle and/or reinforcement element for open and/or hollow structures. Additional aspects of the invention are related to methods for obtaining the inventive product or a thermally expandable or thermally expanded composition made therefrom, as well as the use of the inventive product as a precursor for producing a thermally expandable composition.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including in the vehicle's structural pillars and in the sheet metal of the vehicle doors. It is often desirable to seal such orifices and cavities so as to minimize noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, e.g. automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by e.g. a liquid. For example, during the manufacture process of a vehicle, the hollow parts of a metal frame can still be largely covered by an electro-coating liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to 1500% or more, forming a foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers that can be cross-linked by peroxides, such as ethylene-vinyl acetate polymers, in combination with comparably small, highly functional acrylates which are incorporated into the cross-linked network upon curing. These compositions furthermore contain blowing agents. Under activation conditions, such as elevated temperature, curing of the cross-linkable network takes place, while simultaneously the blowing agent decomposes and releases gases. This leads to the above mentioned volume expansion and the formation of a stable foam which in ideal cases fills the cavity as intended and adheres to its walls. Such a system is for example disclosed in DE 10 2011 080 223 A1.

However, before expanding and formation of a stable foam, thermally expandable compositions are in particular susceptible to moisture. Thus, the stability of known thermally expandable compositions after compounding is rather limited.

Moreover, known thermally expandable compositions typically produce undesired emission during the expansion process, such as e.g. acetaldehyde or formaldehyde. Especially in the automotive industry, many manufacturers rely on the test method VDA 276 to determine the odor of materials used and demand for low-odor materials.

It is thus desirable to obtain thermally expandable compositions which do not suffer from these limitations.

SUMMARY OF THE INVENTION

It is an object of the present invention to provide improved solutions to produce thermally expandable compositions. Especially, materials and processes shall be provided which allow for producing thermally expandable materials with improved stability, especially with regard to moisture resistance, and reduced emissions.

Surprisingly, the present invention provides a solution to these problems by providing a product PR, especially a master-batch for producing thermally expandable compositions, obtainable or obtained by reacting, preferably by extruding, a mixture comprising:

(a) at least one polymer P, cross-linkable by peroxide, and (b) at least one coagent, preferably an acrylate A, and (c) at least one peroxide PE, wherein the mixture is reacted such that the product has an average melt flow index (MFI) of between 0.1 and 8 g/10 min, preferably between 0.2 and 5 g/10 min, more preferably between 0.25 and 1.25 g/10 min.

Especially, the product PR according to the present invention is a pre-crosslinked product. Due to the pre-crosslinking, the melt flow index of the product is rather low. Nevertheless, the melt flow index between 0.1 and 8 g/10 min still allows for processing and blending the product PR. Thus, the product can be used as a master-batch for producing thermally expandable compositions, e.g. by blending the product PR with a blowing agent.

When producing thermally expandable compositions with the inventive product PR, the process of cross-linking can essentially be decoupled from the expansion of the composition which can take place at a later stage. Thus, there is no need to adjust the activation temperature of the peroxide PE used for obtaining the product PR with the activation temperature of a blowing agent used for expanding the composition. This allows for a much more flexible production of thermally expandable compositions. In particular, it is possible to provide for tailor-made and modular compositions which are optimized for individual applications.

Since the product PR is present in a pre-crosslinked or pre-cured state, respectively, the product PR as such, as well as thermally expandable compositions produced thereof, feature an excellent stability and moisture resistance in places with demanding conditions (such as extraordinarily high temperatures) as well as a low level of emissions when subjected to heating processes.

Hence, the product PR is highly advantageous for producing thermally expandable compositions which can be used in sealing, baffle and/or reinforcement elements, for example in automotive applications.

Further aspects of the present invention are subject of other independent claims. Preferred embodiments of the invention are subject of dependent claims.

DETAILED DESCRIPTION OF THE INVENTION

The unit term "wt.-%" means percentage by weight, based on the weight of the respective total composition, if not otherwise specified. The terms "weight" and "mass" are used interchangeably throughout this document.

The term "functionality" in connection with a molecule describes in this document the number of chemical functional groups per molecule. The term "polyfunctional" describes a molecule with more than 1 functional groups of a given type. For example, a polyfunctional acrylate with a functionality of 3 describes a molecule with 3 acrylate groups. The term "average functionality" is used if a mixture of molecules is present that differ slightly in individual functionality, but in average exhibit a given functionality, as it is sometimes the case with technical grade chemicals.

The term "equivalent" in connection with chemical functional groups describes in this document the mass amount of a substance that equals its equivalent weight. Normally, the equivalent weight is defined as the amount of substance that contains 1 mole of a defined functional group, such as an acrylate group or a peroxide function. The ordinarily skilled artisan in the field of polymer composition formulation uses such numbers to calculate appropriate ratios for active components, and such values are commonly provided by producers of functional chemicals, especially polymers. Accordingly, the "equivalent ratio" (EQ) of two substances is understood herein as the ratio of the equivalents of a first substance to the equivalents of the second substance in a given composition.

The term "radical" used in this document describes, as known to a person with ordinary skill in the art of chemistry, a chemical species with an unpaired valence electron. The cross-linking reactions involved in the curing or hardening of the polymer system of the present invention follow a radical mechanism.

Melt flow index (MFI) is determined by the ASTM D1238-13 standard method, using a capillary rheometer at 190° C. and a weight of 2.16 kg. MFI values describe the amount of polymer coming out of the capillary under pressure of the defined weight and at the defined temperature during a given time.

The person skilled in the art knows that reacting a mixture comprising (a) at least one polymer P, cross-linkable by peroxide, and (b) at least one coagent, preferably an acrylate A, and (c) at least one peroxide PE leads to an increase of the molecular weight of the at least one polymer P and therefore an increase in the MFI. Hence for the person skilled in the art, it is clear how the degree of crosslinking or the MFI, respectively, can be controlled. For example, the present application mentions controlling the MFI by the proportions of peroxide and/or coagent. Thus, a person skilled in the art readily can adjust these parameters in order to obtain a product with the claimed MFI. Also, the MFI be directly and positively verified by tests or procedures adequately specified in the description.

Volume changes on the thermally expandable material are determined using the DIN EN ISO 1183:2019 method of density measurement (Archimedes principle) in deionized water in combination with sample mass determined by a precision balance.

The present invention comprises as a first necessary component at least one polymer P that is cross-linkable by peroxide. Principally all thermoplastic polymers or thermoplastic elastomers capable of cross-linking reactions with peroxides are suitable. The artisan skilled in the field describes polymers as "cross-linkable by peroxide" if these polymers contain functional groups, e.g. C—C double bonds, which release hydrogen atoms under influence of a radical starter, e.g. a peroxide, from their backbone or side chain, such that a radical remains that is able to radically attack other polymer chains in a subsequent step, leading to a radical chain reaction cross-linking process and ultimately to a polymer network.

Suitable polymers P include, for example, styrene-butadiene copolymers, styrene-isoprene copolymers, ethylene-vinyl acetate copolymers, ethylene-methacrylate copolymers, ethylene-ethyl acrylate copolymers, ethylene butyl acrylate copolymers, ethylene-(meth)acrylic acid copolymers, ethylene-2-ethylhexyl acrylate copolymers, ethylene-acrylic ester copolymers, polyolefinc block copolymers, and polyolefins such as polyethylene or polypropylene.

The copolymers, meaning polymers made from more than one type of monomer, can be block type copolymers or random copolymers.

Polymers P can also be further functionalized, meaning they can contain further functional groups such as hydroxyl, carboxy, anhydride, acrylate, and/or glycidylmethacrylate groups.

Preferred for the present invention is one or more polymer P with an average melt flow index (MFI) of between 1 and 200 g/10 min, preferably between 10 and 100 g/10 min, more preferably between 25 and 75 g/10 min, most preferably between 35 and 55 g/10 min.

The polymer P preferably comprises ethylene-vinyl acetate (EVA). More preferably more than 70 wt.-%, more than 80 wt.-%, more than 90 wt.-%, more than 95 wt.-%, or more than 99 wt.-%, of the Polymer P consists of ethylene-vinyl acetate (EVA), based on the total amount of the Polymer P.

In this case, the content of vinyl acetate monomers in EVA should be between 8 and 45 wt.-%, preferably between 15 and 30 wt.-%, based on the total weight of the EVA polymer.

In cases where more than one type of polymer is used, the individual MFI combine to an average MFI of the used polymer mixture, which has to be determined according to ASTM D1238-13 (test method: T=190° C., m=2.16 kg; procedure A, condition E).

In a preferred embodiment, more than one type of polymer is used as polymer P. It was found to be beneficial for the properties of the inventive composition to use at least two types of polymer (herein named P1 and P2) with different melt flow index (MFI), one much higher than the other. For example, an especially preferred embodiment uses a first polymer P1 with an MFI of between 100 and 200 g/10 min and a second polymer P2 with an MFI of between 0.1 and 60 g/10 min, preferably between 0.1 and 10 g/10 min, preferably with a weight ratio of the two polymers P1:P2 in the composition of 0.7 to 1.3, preferably 0.8 to 1.2.

Preferred EVA polymers include, e.g., Elvax® 150, Elvax® 240A, Elvax® 260A, Elvax® 420A (all by DuPont), or the corresponding Evatane® copolymers (by Arkema).

The mixture used for obtaining the product PR preferably contains said at least one polymer P with an amount of between 30 and 80 wt.-%, preferably between 40 and 70 wt.-%, more preferably between 40 and 60 wt.-%, based on the weight of the total composition.

Furthermore, the mixture used for obtaining the product PR comprises a coagent. A "coagent" is meant to be an agent which affects the viscous properties of the product. Without being bound by theory it is believed that the coagent increases the cross-linking density of the at least one cross-linkable polymer P.

Preferably, the mixture, based on the total weight of the unreacted mixture, comprises between 0.01 and 10 wt. %, preferably between 0.05 and 3 wt. %, more preferably between 0.3 and 2 wt.-%, in particular between 0.4 and 1.7 wt.-%, especially between 0.5 and 1 wt. %, of the at least one coagent.

In principle, any kind of coagent can be used. A suitable coagent can e.g. be selected from acrylate, cyanurates, vinyl poly(butadiene) and/or vinyl styrene-butadiene copolymer.

Highly preferred, the coagent comprises or consist of at least one acrylate A.

Preferably, the acrylate A is present with an amount of between 0.05 and 3 wt. %, more preferably between 0.3 and 2 wt.-%, in particular between 0.4 and 1.7 wt.-%, especially between 0.5 and 1 wt. %, based on the total weight of the mixture used for obtaining the product PR.

Acrylate A preferably has a molecular weight of less than 2,500 g/mol, more preferably less than 1,000 g/mol.

Acrylate A preferably exhibits an acrylate functionality of at least 2 or 3, preferably between 2 and 6, more preferably between 3 and 5, most preferably 5. More preferably, the acrylate A comprises a polyfunctional acrylate with an acrylate functionality of at least 2 or 3, preferably between 2 and 6, more preferably between 3 and 5, most preferably 5, in an amount of more than 70 wt.-%, more than 80 wt.-%, more than 90 wt.-%, more than 95 wt.-%, more than 99 wt.-%, based on the total amount of the Acrylate A.

Although polymer P (described above) can comprise acrylate functions, it is beneficial for the inventive composition that these two components are not the same chemical compound. In comparison, acrylate A is generally smaller than polymer P in terms of molecular weight and acts as cross-linker for polymer P also. Using both components, Polymer P and acrylate A, will lead to better mechanical properties in the final product and can improve the stability of a foam structure during and after expansion.

Preferred acrylates A with a functionality of 2 include ethylene glycol dimethacrylate, diethylene glycol dimethacrylate, triethylene glycol dimethacrylate, triethylene glycol diacrylate, tripropylene glycol dimethacrylate, 1,3-butanediol dimethacrylate, 1,4-butanediol dimethacrylate, 1,10-dodecanediol dimethacrylate, 1,6-hexandieol dimethacrylate, neopentylglycol dimethacrylate, and polybutylene glycol dimethacrylate.

Preferred acrylates A with a functionality of 3 or higher include glycerol triacrylate, pentaerythritol triacrylate, pentaerythritol trimethacrylate, trimethylolpropane triacrylate, trimethylolpropane trimethacrylate, tetramethylolmethane tetraacrylate, Di-(trimethylolpropane) tetraacrylate, pentaerythritol tetraacrylate, dipentaerythritol pentaacrylate, dipentaerythritol hexaacrylate, tri(2-methacryloxyethyl) trimellitate, tri(2-acryloxyethyl) isocyanurate, as well as their ethoxylated or propoxylated derivates.

Especially preferred acrylates A exhibit a functionality of 5, such as dipentaerythritol pentaacrylate.

Further preferred acrylates A include highly functional, hyperbranched acrylates with functionalities of between 6 and 16, or higher. Examples of such preferred acrylates include hyperbranched polyester-polyacrylates, for example Sartomer® CN2303 and Sartomer® CN2305, both by Arkema.

A further necessary component of the mixture used for obtaining the product PR according to the present invention is at least one peroxide PE.

Based on the total weight of the unreacted mixture, the mixture in particular comprises between 0.05-10 wt. %, preferably between 0.1 and 2.5 wt. %, more preferably between 0.2 and 2 wt.-%, in particular between 0.3 and 1.5 wt.-%, especially between 0.4 and 1.3 wt. %, of the at least one peroxide PE.

In particular, in the reaction for obtaining the product PR, between 90 and 100 wt.-%, especially between 95 and 100 wt.-%, preferably, between 98 and 100 wt.-%, more preferred between 99 and 100 wt. % of the peroxide initially present in the mixture for obtaining the product PR, is reacted.

Especially, in the obtained product, based on the initial amount of peroxide PE initially present in the mixture for obtaining product PR, a content of the at least one peroxide PE in unreacted state is between 0 and 5 wt. %, preferably between 0 and 2 wt. %, more preferably between 0 and 1 wt.-%, in particular between 0 and 0.5 wt.-%, especially between 0 and 0.1 wt. %.

It is advantageous for the inventive composition to use a peroxide that is essentially inert at room temperature (23° C.) and exhibits an activation temperature suitable for the intended purpose. Specifically, the optimal temperature and duration (dwell time) depends on the peroxide used in the mixture for obtaining the inventive product. These values are provided by the manufacturers of such components and/or are known to the ordinarily skilled artisan. Commonly, such activation temperatures are in the range of 130° C. to 250° C., preferably 150° C. to 200° C., and require a dwell time of between 10 and 90 min, preferably between 15 and 60 min.

Preferred peroxides for the inventive composition are organic peroxides, such as keton peroxides, diacyl peroxides, peresters, perketals, and hydroperoxides. Examples of such preferred peroxides include cumene hydroperoxide, t-butyl peroxide, bis(t-butylperoxy)-diisopropyl benzene, di(t-butylperoxy isopropyl) benzene, dicumyl peroxide, t-butylperoxy benzoate, di-alkylperoxy dicarbonate, diperoxyketals (such as 1,1-di-t-butylperoxy-3,3,5-trimethyl cyclohexane), keton peroxides (such as methyl ethyl keton peroxide), and 4,4-di-t-butylperoxy-n-butyl valerate.

Especially preferred are 3,3,5,7,7-pentamethyl-1,2,4-trioxepane, 2,5-dimethyl-2,5-di(t-butylperoxy)-3-hexyne, di-t-butyl peroxide, 2,5-dimethyl-2,5-di(t-butylperoxy) hexane, t-butyl cumyl peroxide, di(t-butylperoxy isopropyl) benzene, dicumyl peroxide, butyl-4,4-di(t-butylperoxy) valerate, t-butylperoxy-2-ethylhexyl carbonate, 1,1-di(t-butylperoxy)-3,3,5-trimethyl cyclohexane, t-butylperoxy benzoate, di(4-methylbenzoyl) peroxide, and dibenzoyl peroxide.

Most preferred peroxides for the present inventive composition include dicumyl peroxide, available for example under the trade names Perkadox® BC-40B-PD by Akzo Nobel or Peroxan® DC-40 PK by Pergan and/or di(t-butylperoxyisopropyl) benzene, available for example under the trade names Perkadox® 14-40B-PD by Akzo Nobel or Peroxan® BIB-40 P by Pergan, wherein di(t-butylperoxy-isopropyl) benzene is especially preferred.

It may be advantageous for the present invention to use a peroxide that is immobilized on a support material, such as silica, kaolin, and/or calcium carbonate, or other suitable materials. This approach may facilitate handling, dosage, and evenly distribution of the peroxide in the composition. Examples for such immobilized peroxide include Perkadox® BC-40B-PD by Akzo Nobel (40 wt.-% dicumyl peroxide on calcium carbonate) or Perkadox® 14-40K-PD by Akzo Nobel (40 wt.-% di(t-butylperoxyisopropyl) benzene on clay and silica). However, care has to be taken in such cases to correctly calculate the wt.-% and especially the equivalents of active substance in the composition, as in this document these values always refer to active compound, and do not include possibly present support material.

In particular, a weight ratio of the at least one polymer P to the at least one peroxide PE in the mixture used for obtaining the product PR is between 1 and 500, preferably between 20 and 300, more preferably between 30 and 250, in particular between 50 and 200.

Apart from the above mentioned ingredients, the mixture used for obtaining the product PR may contain other components commonly used in such mixtures and known to the ordinarily skilled artisan in the field. These include, for example, fillers, colorants, dispersion aids or homogenizers, adhesion promoters, antioxidants, stabilizers, and the like.

Suitable as fillers are, e.g., ground or precipitated calcium carbonate, calcium-magnesium carbonate, talcum, gypsum, graphite, barite, silica, silicates, mica, wollastonite, carbon black, or the mixtures thereof, or the like.

Fillers are, if at all, preferably incorporated in the inventive compositions with an amount of between 1 and 15 wt.-%, based on the total weight of the mixture.

Colorants or dyes, such as pigments, e.g. on the basis of carbon black, may be included in the present inventive compositions. Their amount is preferably between 0 and 1 wt.-%, based on the total weight of the mixture.

Dispersion aids or homogenizers, sometimes described as wetting agents or surface-active agents, may be beneficial for the present inventive composition in order to facilitate a homogeneously mixed composition. Preferably used such compounds include hydrocarbon resins, for example Novares® TL 90 available from Rutgers, Germany, Wingtack® resins (by Cray Valley), Escorez® tackifying resins (e.g., Escorez® 1304, by ExxonMobil), and Piccotac® hydrocarbon resins (e.g., Piccotac® 1100 or Piccotac® 1100E, by Eastman). Such compounds are preferably included in the mixture used for obtaining the product PR with an amount of between 2 and 10 wt.-%, preferably between 4 and 8 wt.-%, more preferably between 5 and 7 wt.-%, based on the total weight of the composition.

In preferred embodiments, the mixture used for obtaining the product PR also includes adhesion promoters. Preferably these substances are incorporated into the polymer network during the cross-linking reactions via functional groups similar to those present in polymer P. Suitable adhesion promoters include, for example, ethylene-glycidyl methacrylate copolymers, such as Lotader® ADX 1200S, Lotader® AX8840, Lotader® 3210, Lotader® 3410 (by Arkema) or Lotryl® copolymers (by Arkema).

Adhesion promoters are preferably used in compositions according to the present invention with an amount of between 2 and 15 wt.-%, preferably between 4 and 10 wt.-%, more preferably between 5 and 7 wt.-%, based on the total weight of the mixture used for obtaining the product PR.

Further potentially useful additives include antioxidants and stabilizers, commonly used in polymer-based compositions and known to the person skilled in the art of polymer-based composition formulation. Examples of suitable antioxidants and stabilizers include sterically hindered thioethers, sterically hindered aromatic amines, and/or sterically hindered phenols, such as bis(3,3-bis(4'-hydroxy-3-t-butylphenyl)butanoic acid) glycol ester. Such substances are preferably included with an amount of between 0 and 0.5 wt.-%, preferably between 0.1 and 0.3 wt.-%, based on the total weight of the mixture used for obtaining the product PR.

Especially, the mixture, based on the total weight of the unreacted mixture used for obtaining the product PR, comprises an overall content of polymeric components of between 80 and 99.9 wt. %, preferably between 85 and 99 wt. %, more preferably between 86 and 97 wt.-%, in particular between 87 and 95 wt.-%.

Highly preferred, the mixture used for obtaining the product PR as such is essentially free of a blowing agent, especially essentially free of a blowing agent based on azo compounds, hydrazides, nitroso compounds, carbamates, and/or carbazides. More preferred, the mixture used for obtaining the product PR as such is essentially free of a blowing agent as described below. Especially, the same is true for the product PR.

Thus, preferably, the reaction for obtaining the product PR takes place essentially in the absence of a blowing agent, especially in the absence of a blowing agent as mentioned in the last paragraph and/or of a blowing agent as described below.

In the context of the present document, the term "essentially in the absence of a blowing agent" means that, based on the total weight of the unreacted mixture, a proportion of a blowing agent in the unreacted mixture used for obtaining the product PR is between 0 and 1 wt.-%, especially between 0 and 0.5 wt.-%, preferably between 0 and 0.1 wt.-%, more preferred between 0 and 0.01 wt. %, especially preferred 0 wt.-%.

Further details about the reaction conditions suitable for obtaining the product RP are given below in connection with the inventive methods.

A further aspect of the present invention is as thermally expandable composition comprising a product PR as defined above and at least one blowing agent.

A "blowing agent" is a substance which is capable of producing cellular structure via a foaming process. The expansion of the thermally expandable composition according to the present invention is triggered by heat. This means, the blowing agent is activated by a thermal process that exceeds its respective activation temperature and exhibits a duration long enough for the expansion processes to proceed until the expandable material has expanded and cured into its intended final (sufficiently expanded and stable) state. The optimal temperature and duration (dwell time) depend on the blowing agent used. These values are provided by the manufacturers of such components and/or are known to the ordinarily skilled artisan. Commonly, such activation temperatures are in the range of 130° C. to 250° C., preferably 150° C. to 200° C., and require a dwell time of between 10 and 90 min, preferably between 15 and 60 min.

A suitable blowing agent may be a chemical or physical blowing agent. Chemical blowing agents are organic or inorganic compounds that decompose under influence of, e.g., temperature or humidity, while at least one of the formed decomposition products is a gas. Physical blowing agents include, but are not limited to, compounds that become gaseous at a certain temperature. Thus, both chemical and physical blowing agents are suitable to cause an expansion in the thermally expandable composition.

Preferred chemical blowing agents include but are not limited to azo compounds, hydrazides, nitroso compounds, carbamates, and carbazides.

Chemical blowing agents are preferred for the present inventive composition. Suitable chemical blowing agents are, e.g., azodicarbonamide, azoisobutytronitrile, azocyclohexyl nitrile, dinitrosopentamethylene tetramine, azodiamino benzene, benzene-1,3-sulfonyl hydrazide, calcium azide, 4,4'-diphenyldisulphonyl azide, p-toluenesulphonyl hydrazide, p-toluenesulphonyl semicarbazide, 4,4'-oxybis (benzenesulphonylhydrazide), trihydrazino triazine, and N,N'-dimethyl-N,N'-dinitrosoterephthalamide, and combinations thereof and the like.

Also suitable are dual chemical systems, such as acid/base systems that generate gases upon reaction. One preferred example is sodium hydrogen carbonate and citric acid, a system that generates carbon dioxide when combined in a suitable medium.

Suitable physical blowing agents include expandable microspheres, consisting of a thermoplastic shell filled with thermally expandable fluids or gases. An example for such suitable microspheres are Expancel® microspheres (by AkzoNobel).

In a preferred embodiment, the blowing agent comprises or essentially consists of one or several selected from the list of azodicarbonamide, Expancel® microspheres, and 4,4'-oxybis(benzenesulphonylhydrazide), most preferably azodicarbonamide.

Preferably, the blowing agent is included in the present inventive thermally expandable composition with an amount of between 2 and 15 wt.-%, preferably between 4 and 12 wt.-%, more preferably between 5 and 10 wt.-%, based on the total weight of the composition.

If azodicarbonamide is included in the present inventive thermally expandable composition, it is preferably used with an amount of between 1 and 15 wt.-%, preferably between 5 and 10 wt.-%, more preferably between 7 and 9.5 wt.-%, based on the total weight of the composition.

The heat required for the decomposition reaction that causes the foaming (expansion) can be applied externally or internally, the latter e.g. from an exothermic reaction. Preferably, the blowing agent can be activated (i.e. decomposes under gas release) at a temperature of less than 160° C., especially between 80° C. to 150° C., more preferably between 90° C. and 140° C.

If the present inventive thermally expandable composition finds a use in a sealant, baffle and/or reinforcement element, e.g. in automotive manufacturing, it is preferable that the activation temperature of the blowing agent is adjusted to the manufacturing conditions, e.g. of the automotive part, to be sealed, baffled and/or reinforced. As an example, the baffle and/or reinforcement element can be inserted into a cavity of a structure that needs to be treated by an electrocoating liquid, in its unexpanded state still leaving the surface of the structure accessible, and subsequently, during the heat treatment of the automotive part (i.e. the curing procedure for the electrocoating liquid), the baffle and/or reinforcement element simultaneously (or shortly thereafter) expands to its intended final shape and at least partially closes or fills the cavity. In such a case, the expansion temperature should correspond to the temperature conditions of said heat treatment, i.e. to between 90° C. and 200° C.

It is further preferred that the inventive thermally expandable composition contains less than 2 wt.-%, less than 1 wt.-%, preferably less than 0.5 wt.-%, more preferably less than 0.2 wt.-%, based on the total weight of the composition, of:

sulfate salts, preferably of alkyl sulfates, and fatty alcohol polyglycol ether sulfates.

It is advantageous for the present invention to use an activator, accelerator, or catalyst in combination with the blowing agent. Examples of compounds suitable for this purpose include zinc compounds, such as zinc oxide, zinc stearate, zinc bis(p-toluenesulphinate), or zinc bis(benzenesulphinate), or magnesium oxide, and/or (modified) urea compounds. Most preferred are zinc compounds, especially zinc oxide.

The inventive thermally expandable composition preferably comprises such an activator for said blowing agent with an amount of between 2 and 10 wt.-%, preferably between 4 and 8 wt.-%, more preferably between 5 and 7 wt.-%, based on the total weight of the composition.

According to a special embodiment, the at least one blowing agent is part of another thermally expandable composition which is mixed with the inventive product PR.

Further details about the conditions suitable for obtaining the thermally expandable compositions are given below in connection with the inventive methods.

Another aspect of the present invention is the use of such thermally expandable compositions for the manufacturing of baffle and/or reinforcement elements. Such elements are used to seal, baffle, and/or reinforce open or hollow structures, e.g. a cavity in an open or hollow structural part of an automobile. Hollow parts in cars may include body components (e.g., panels), frame components (e.g., hydroformed tubes), pillar structures (e.g., A, B, C, or D-pillars), bumpers or the like. Open parts in cars may include roofs or doors.

If such elements are used to seal or baffle then the structures are preferably hollow structures. If such elements are used to reinforce then the structures can be open or hollow, preferably they are open structures, especially when the thermally expandable composition has a sheet-like structure.

Another aspect of the present invention is a baffle and/or reinforcement element for open and/or hollow structures, wherein said element comprises a thermally expandable composition as described before.

In one preferred embodiment, such a baffle and/or reinforcement element for open and hollow structures consists essentially, preferably exclusively, of a thermally expandable composition. In this case, it is advantageous to design the shape of the element in a way that it can be easily fitted into and attached to the walls of the open or hollow structure to be baffled and/or reinforced.

Preferably, the thermally expandable composition has a sheet-like structure with a thickness of 0.1 to 1 mm, 0.2 to 0.8 mm, preferably 0.3 to 0.7 mm.

It may be further advantageous if the thermally expandable composition has a sheet-like structure with a length of 5 to 300 cm, preferably 100 to 250 cm and a width of 5 to 300 cm, preferably 50 to 150 cm. With such a form the element is especially suited to seal, baffle, or reinforce, preferably reinforce, larger areas, e.g. as patches. In case the element has a width of 1 to 20 cm, preferably 2 to 10 cm, the element is especially suited to be used as stripes to seal, baffle, or reinforce.

Manufacturing is in this case preferably done by injection molding, punching or stamping, or extrusion through a shape template.

In another preferred embodiment, such a baffle and/or reinforcement element for open or hollow structures comprises, apart from the thermally expandable composition, a carrier element on which the inventive thermally expandable composition is deposited or attached. Such a design may be more cost-efficient and it may facilitate fixation of the baffle and/or reinforcement element on the walls of the structure to be baffled and/or reinforced, e.g. by incorporation of pins, bolts, or hooks on the carrier element. Furthermore, with a suitable design of the carrier element, the mechanical performance and stability of the baffle and/or reinforcement element according to the present invention can be increased.

Preferably, the thermally expandable composition has a sheet-like structure with the preferred thickness, length and/or width as described above.

Said carrier element may consist of any material that can be processed into a shape useable for an embodiment of the present invention.

Preferred materials are polymeric materials, such as a plastic, elastomers, thermoplastics, thermosettable polymers, a blend or other combination thereof, or the like. Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Especially preferred are high-temperature stable polymers such as poly(phenyl ethers), polysulfones, polyethersulfones, polyamides, preferably polyamide 6, polyamide 6,6, polyamide 11, polyamide 12, or a mixture thereof. Other suitable materials include metals, especially aluminum or steel, or naturally grown, organic materials, such as wood or other (pressed) fibrous materials. Also glassy or ceramic materials can be used. It is possible to use any combination of such materials. It is also contemplated that such materials can be filled (e.g. with fibers, minerals, clays, silicates, carbonates, combinations thereof or the like) or foamed.

Preferably the carrier is made of polymeric materials and metals, more preferably metals, especially aluminum or steel.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

Preferably, the carrier has a sheet-like structure with a thickness of 0.1 to 5 mm, 0.2 to 3 mm, 0.5 to 2 mm, preferably 0.75 to 1.5 mm.

It may be further preferred if the carrier has a sheet-like structure with a width and/or length that corresponds to +/− more than 50%, more than 60%, more than 70%, preferably more than 80%, most preferably more than 90%, of the width and/or length of the sheet-like structure of the thermally expandable composition.

Most preferred the carrier and the thermally expandable composition have a sheet-like structure with a thickness that is described above as a preferred thickness for the carrier, respectively the sheet-like structure. Further, it is preferred if the carrier has a width and length that is more than 80%, most preferably more than 90%, of the width and length of the sheet-like structure of the thermally expandable composition. Such an element is especially suited as a reinforcement element for open or hollow structures, preferably open structures.

The manufacturing process of a baffle and/or reinforcement element in accordance with the present invention depends largely on the material of the carrier element. If the material of the carrier element can be (injection-) molded or extruded, the whole baffle and/or reinforcement element can be produced in a two-step injection-molding process or a co-extrusion process of the carrier element and the thermally expandable composition. If using a two-step injection molding process, in a first step, material for the carrier element is injected into the mold. After solidification, the cavity of the injection molding tool is enlarged or adjusted, or the injection-molded piece is transferred into another tool and the second component, in this case the material for the thermally expandable composition, is injected.

If the carrier element is not shaped by injection-molding or extrusion, e.g., because it consists of a metal or alloy, it may be first manufactured by a suitable process and then introduced into the injection-molding tool, and the thermally expandable composition may be injection-molded into the tool where the carrier element was placed. Another possibility is to extrude the thermally expandable composition onto the pre-fabricated carrier element. Of course there is also the possibility of manufacturing the carrier element and the expandable composition element individually by a suitable process, and then attaching the expandable composition element to the carrier element by any suitable means, such as chemically or physically, e.g. by gluing or the like, or mechanically, e.g. by bolting, screwing, or the like.

Another aspect of the present invention is the use of the baffle and/or reinforcement element as described above to seal, baffle, and/or reinforce, especially reinforce, a cavity or hollow or open structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

A further aspect of the present invention is a method for sealing, baffling and/or reinforcing, preferably reinforcing, a cavity or hollow structure, characterized in that an element comprising a thermally expandable composition as described above is introduced into said cavity or hollow structure and subsequently thermally expanded such that said cavity or hollow structure is at least partially filled by the expanded composition. Preferred temperature for the thermal expansion process is between 110° C. and 220° C., 120 and 210° C., preferably 140 and 200° C. Preferred baking time for the compositions is between 5 min and 90 min, preferably 10 and 60 min, more preferably 15 and 30 min Furthermore, the present invention is directed to a method for obtaining a product, especially a product RP as defined above, comprising the step:

i) reacting, preferably by extruding, a mixture comprising:
  (a) at least one polymer P, cross-linkable by peroxide, and
  (b) at least one coagent, preferably an acrylate A, and
  (c) at least one peroxide PE, wherein the mixture is reacted such that the product has an average melt flow index (MFI) of between 0.1 and 8 g/10 min, preferably between 0.2 and 5 g/10 min, more preferably between 0.25 and 1.25 g/10 min.

Thereby, the at least one polymer P, the at least one coagent, the acrylate A, and the at least one peroxide PE are defined as described above in connection with the product RP and the thermally expandable composition.

Especially, the reaction takes place in the absence of a blowing agent, especially in the absence of a blowing agent as mentioned above.

In particular, the reaction of the mixture in step i) is effected at a temperature between 150 and 250° C., especially between 170 and 220° C., preferably between 180 and 210° C., in particular for a duration of 10-360 seconds, especially 30-60 seconds.

Especially, the reaction of the mixture in step i) takes place in any suitable mixing apparatus, e.g. in a dispersion mixer, planetary mixer, twin mixer, continuous mixer, extruder, and/or dual screw extruder. Especially preferred, the reaction of the mixture in step i) takes place in an extruder, more preferred in a dual screw extruder. Such kind of mixing apparatus have shown be highly suitable to obtain a homogeneous product.

In particular, in the reaction for obtaining the product PR, between 90 and 100 wt.-%, especially between 95 and 100 wt.-%, preferably, between 98 and 100 wt.-%, more preferred between 99 and 100 wt. % of the peroxide PE initially present in the mixture for obtaining the product PR, is reacted.

In another aspect, the invention is directed to a method for producing a thermally expandable composition comprising the steps of:

i) Obtaining a product PR by reacting, preferably by extruding, a mixture comprising:
   (a) at least one polymer P, cross-linkable by peroxide, and
   (b) at least one coagent, preferably an acrylate A, and
   (c) at least one peroxide PE,
ii) Mixing the product PR obtained in step i) with at least one blowing agent and optionally extruding the mixture.

Thereby, step i) in this method for producing a thermally expandable composition is the same as step i) in the above-mentioned method for method for obtaining a product.

Preferably, the mixing in step ii) takes place in any suitable mixing apparatus, e.g. in a dispersion mixer, planetary mixer, twin mixer, continuous mixer, extruder, and/or dual screw extruder. Especially preferred, the mixing in step ii) takes place in an extruder, more preferred in a dual screw extruder.

Preferably, the mixing in step ii) is effected at a temperature between 50 and 150° C., especially between 70 and 130° C., preferably between 80 and 120° C., in particular for a duration of 10-360 seconds, especially 30-60 seconds.

In a special embodiment, step i) in the method for producing a thermally expandable composition is effected at a higher temperature than step ii).

According to another preferred embodiment, the at least one blowing agent used in step ii) is part of another thermally expandable composition which is mixed with the inventive product PR obtained in step i).

After the mixing in step ii), the resulting thermally expandable composition may be shaped into its desired form by, e.g., extruding, blow-molding, pelleting, injection molding, compression molding, punching or stamping or any other suitable process.

Furthermore, the present invention is directed to a method for producing a thermally expanded composition comprising the steps of:

i) Obtaining a product PR by reacting, preferably by extruding, a mixture comprising:
   (a) at least one polymer P, cross-linkable by peroxide, and
   (b) at least one coagent, preferably an acrylate A, and
   (c) at least one peroxide PE,
ii) Obtaining a thermally expandable composition by mixing the product PR obtained in step i) with at least one blowing agent and optionally extruding the mixture.
iii) Expanding the thermally expandable composition obtained in step ii) by a heat treatment.

Thereby, steps i) and ii) in this method for producing a thermally expanded composition are the same as steps i) and ii) in the above-mentioned method for producing a thermally expandable composition.

Preferably, step iii) is effected at a temperature between 110 and 260° C., especially between 150 and 250° C., preferably between 170 and 220° C., for a duration of between 5 and 90 min, preferably, between 10 and 60 minutes, especially between 20 and 40 minutes.

In particular, step iii) is effected such that the thermally expandable composition obtained in step ii) increases its volume by at least 1,000%, preferably at least 1,500%, more preferably at least 2,000%, especially at least 2,500%.

Preferably the thermal expansion is measured in volume changes on the thermally expandable material by using the DIN EN ISO 1183:2019 method of density measurement (Archimedes principle) in deionized water in combination with sample mass determined by a precision balance.

According to a preferred embodiment, step ii) of the method for producing a thermally expanded composition is effected outside a means of transportation and step iii) is effected inside a body of a means of transportation, especially in an automotive body.

Another aspect of the invention is a method for sealing, baffling and/or reinforcing a cavity and/or hollow structure, whereby an element comprising or consisting of a thermally expandable composition as described above is introduced into said cavity and/or hollow structure and subsequently thermally expanded such that said cavity or hollow structure is at least partially filled by the expanded composition. Preferably, the thermal expansion is effected as described above. Preferred temperature for the thermal expansion process is between 130° C. and 250° C.

Further aspects of the present invention are related to several uses of the product RP as described above.

For example, in a highly advantageous embodiment, the product RP as described above is used as a master-batch and/or precursor for producing a thermally expandable composition. Thereby, the thermally expandable composition preferably is defined as described above.

Furthermore, the product RP as described above can be used as a master-batch for mixing with another thermally expandable composition.

According to another highly advantageous embodiment, the product RP as described above is used for producing a baffle and/or a reinforcer, especially as defined above. Preferably the baffle and/or a reinforcer is designed for baffling, sealing and/or reinforcing a cavity or hollow structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

The invention is further explained in the following experimental part which, however, shall not be construed as limiting the scope of the invention.

EXAMPLES

Figure 1:
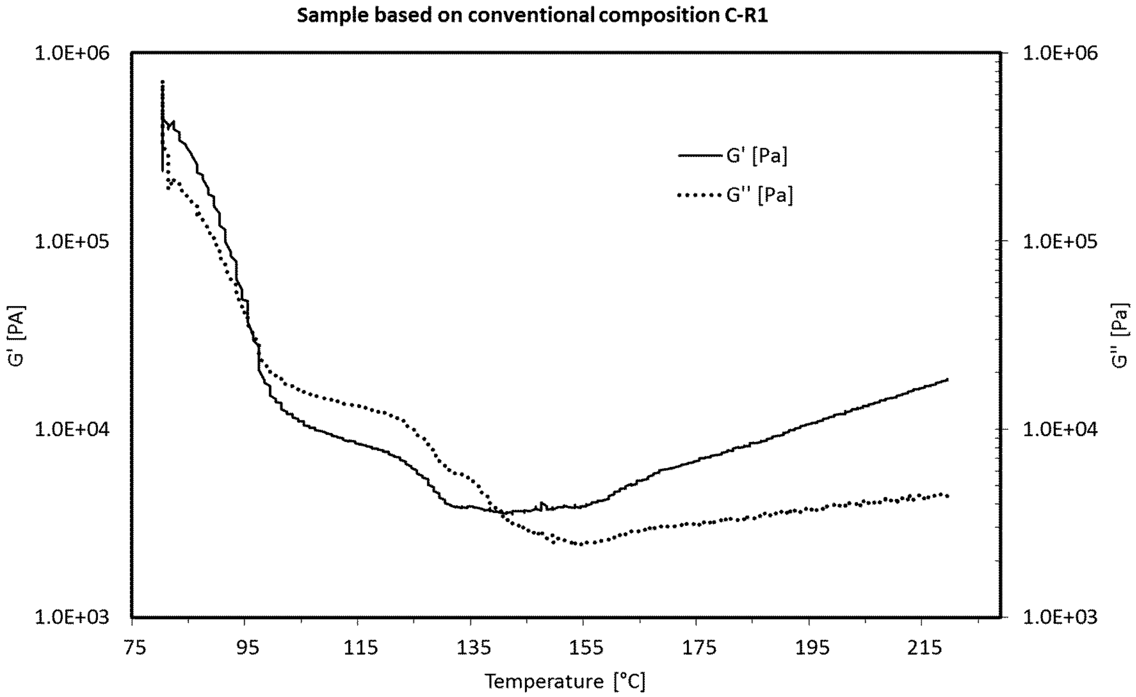
FIG. 1 shows the storage modulus (G') and the loss modulus (G") of a sample made from a conventional thermally expandable composition as a function of temperature.

1. Formulation of Master-Batches and Thermally Expandable Compositions

1.1 Ingredients

Details on the ingredients used in the examples are listed in the following Table 1:

TABLE 1

Details on the ingredients and their trade names used in the inventive and non-inventive example compositions in this document.

| Ingredient | Description | Properties or trade name |
|---|---|---|
| Polymer P1 | Ethylene-vinyl acetate (EVA) copolymer resin | EVA with 18 wt.-% vinyl acetate monomer and a melt flow index (MFI) of 150 g/10 min (ATSM D1238) |
| Polymer P2 | Ethylene-vinyl acetate (EVA) copolymer resin | EVA with 28 wt.-% vinyl acetate monomer and a MFI of 6 g/10 min (ATSM D1238) |
| Adhesion promoter (AP) | Ethylene-glycidyl methacrylate copolymer (8 wt.-% glycidyl methacrylate) | MFI of 5 g/10 min (ASTM D1238) |
| Tackifier | C5-C9-Hydrocarbon resin | Mn 1100 g/mol, Mw 2000 g/mol, |
| Dispersion aid | Polyethylene wax | Melting point 118° C. (ASTM D3954) |
| Stabilizer | Stabilizer | Irganox 1010 |
| Filler | Calcium carbonate | |
| ZnO | Zinc oxide, Activator | Sigma Aldrich, Switzerland |
| ACDA | Azodicarbonamide | Tramaco, Germany |
| PE | Peroxide, Di-(2-tert.-butyl-peroxyisopropyl)-benzene (40 wt.-%) on calcium carbonate and silica | Pergan, Germany |
| Acrylate (A) | Dipentaerythritol pentaacrylate | Sartomer Arkema |

1.2 Master-Batches 6 examples of inventive master-batches (product PR) (E1 to E6) and 3 non-inventive reference master-batches (R1 to R3) were prepared according to the following procedure: The ingredients were mixed in a dual screw extruder (Berstorff ZE-25R twin screw extruder; 200 rpm) at a temperature of 35° C. in the first section of the mixing zone, at a temperature of 185° C. in the middle section of mixing zone and at a temperature of 170° C. at the end section of the mixing zone. Subsequently, the so obtained products were extruded with a throughput of 10 kg/hour.

The individual compositions of the master-batches in wt.-%, based on the total weight of the respective master-batch as well as their melt flow indexes (MFI; measured according to standard ASTM D1238-13; test method: T=190° C., m=2.16 kg; procedure A, condition E) and peroxide content, are listed in tables 2 and 3.

TABLE 2

Compositions of inventive master-batches produced.

| | E1 | E2 | E3 | E4 | E5 | E6 |
|---|---|---|---|---|---|---|
| Ingredients | | | | | | |
| P1 [wt.-%] | 44.18 | 44.14 | 44.48 | 44.28 | 44.45 | 44.62 |
| P2 [wt.-%] | 25.77 | 25.75 | 25.94 | 25.82 | 25.92 | 26.02 |
| AP [wt.-%] | 20.52 | 20.5 | 20.66 | 20.57 | 20.65 | 20.73 |
| A [wt.-%] | 0.37 | 0.75 | 0.05 | 0.75 | 0.41 | 0.05 |
| Dispersion aid [wt.-%] | 7.96 | 7.95 | 8.01 | 7.98 | 8.01 | 8.04 |
| PE [wt.-%] | 1.20 | 0.91 | 0.87 | 0.60 | 0.57 | 0.54 |
| TOTAL | 100.00 | 100.00 | 100.00 | 100.00 | 100.00 | 100.00 |
| Proportions | | | | | | |
| A/PE | 0.31 | 0.83 | 0.06 | 1.24 | 0.71 | 0.09 |
| P/A (P = P1 + P2) | 246 | 121 | 1822 | 121 | 224 | 1827 |
| P/PE | 75 | 100 | 105 | 150 | 159 | 168 |
| Product properties | | | | | | |
| MFI [g/10 min] | 0.34 | 0.35 | 1.21 | 2.85 | 2.25 | 4.85 |
| Peroxide converted [% of initially provided peroxide] | >99.9 | >99.9 | >99.9 | >99.9 | >99.9 | >99.9 |

TABLE 3

Compositions of non-inventive master-batches produced.

| | R1 | R2 | R3 |
|---|---|---|---|
| Ingredients | | | |
| P1 [wt.-%] | 44.67 | 44.80 | 44.51 |
| P2 [wt.-%] | 26.05 | 26.12 | 25.96 |
| AP [wt.-%] | 20.75 | 20.81 | 20.67 |
| A [wt.-%] | 0.38 | 0.10 | 0.72 |
| Dispersion aid [wt.-%] | 8.08 | 8.07 | 8.02 |
| PE [wt.-%] | 0.10 | 0.10 | 0.12 |
| TOTAL | 100.00 | 100.00 | 100.00 |
| Proportions | | | |
| A/PE | 3.75 | 0.95 | 5.95 |
| P/A (P = P1 + P2) | 244 | 966 | 128 |
| P/PE | 915 | 917 | 759 |
| Product properties | | | |
| MFI [g/10 min] | 12.44 | 21.44 | 8.92 |
| Peroxide converted [% of initially provided peroxide] | >99.9 | >99.9 | >99.9 |

From the results in tables 2 and 3 it is evident that the proportion of PE or the ratio of P/PE, respectively, is related to the MFI. The more PE or the lower the ratio of P/PE, the lower the MFI. A lower MFI is indicative for a higher degree of cross-linking in the product.

For instance, example 2 with 0.91 wt.-% PE, 0.75 wt.-% acrylate (A) and P/PE=100 has an MFI of 0.35 whereas example 4 with the same proportion of acrylate, 0.6 wt.-% PE, and P/PE=150 has an MFI of 2.85. Likewise, example 3 with 0.87 wt.-% PE, 0.05 wt.-% acrylate (A) and P/PE=105 has an MFI of 1.21 whereas example 6 with the same proportion of acrylate, 0.54 wt.-% PE and P/PE=168 has an MFI of 4.85.

Moreover, it is evident that the proportion of acrylate (A) or the ratio of P/A, respectively, is related to the MFI. The higher the proportion of acrylate or the lower the ratio of P/A, the lower the MFI. For instance, example 7 with 0.38 wt.-% acrylate and P/A=244 the MFI is 12.44 whereas example 8, which has the same proportion of PE as example 7, 0.1 wt.-% of acrylate and P/A=966, the MFI is 21.44. A similar situation can be recognized when comparing example 2 versus example 3 or example 5 versus example 6.

1.3 Conventional Thermally Expandable Composition

A non-inventive thermally expandable reference composition (C-R1) was prepared based in the ingredients given in table 4 and the procedure described below. The melt flow index of this composition was determined according to a test similar to the method defined in standard ASTM D1238-13. However, in order to prevent expansion of the composition, the melt flow index was determined at a temperature of 110° C. and a weight of 5 kg.

TABLE 4

Composition of a conventional thermally expandable composition.

| | C-R1 |
|---|---|
| Ingredients | |
| P1 [wt.-%] | 31 |
| P2 [wt.-%] | 18 |
| AP [wt.-%] | 14 |
| Tackifier [wt.-%] | 6 |
| Acrylate [wt.-%] | 0.5 |
| Dispersion aid [wt.-%] | 6 |
| Stabilizer [wt.-%] | 0.5 |
| Filler [wt.-%] | 10 |
| ZnO [wt.-%] | 4 |
| ACDA [wt.-%] | 8 |
| PE [wt.-%] | 2 |
| TOTAL | 100.0 |
| Properties | |
| MFI [g/10 min] | 25 |

For producing the non-inventive thermally expandable reference composition C-R1, the following procedure was followed:

In a first step, polymer P1 and polymer P2, the adhesion promoter, and the dispersion aid were mixed and melted at 95° C. with a mixing rate of 50 rpm (rounds per minute) during 10 min (minutes). After this, half of the activator amount was added during 1 min and mixing was continued during 4 min at 50 rpm. Mixing was continued at 20 rpm during 5 min until the mixture cooled down to 95° C.

After this, the azodicarbonamide, acrylate, and the second half of the activator amount were added during 1 min, followed by mixing at 50 rpm for 1 min. Finally the peroxide and all the rest were added during 1 min and mixing was continued for 2 min at 50 rpm.

The mixtures were molded with a temperature of 90° C. and a pressure of 60 bar during 15 s (seconds) into test shapes with a dimension of 25×25×3 mm (millimeters). These test shapes were cooled down to room temperature (23° C.) and used for the subsequently described expansion test experiments.

1.4 Thermally Expandable Compositions Based on Master-Batches

An inventive thermally expandable composition C-1 was produced by mixing 50 wt.-% of master-batch E1 and 50 wt.-% of thermally expandable reference composition C-R1 and extruding the mixture at a temperature of 100° C. Thereby, the blowing agent (ACDA, cf. table 1) of the thermally expandable composition C-R1 is introduced to composition C-1 as a component of reference composition C-R1.

For reasons of comparison, a thermally expandable reference composition C-R2 was produced by mixing 50 wt.-% of master-batch R3 (not according to the invention) and 50 wt.-% of thermally expandable reference composition C-R1 and extruding the mixture at a temperature of 100° C.

The mixtures were molded with a temperature of 90° C. and a pressure of 60 bar during 15 s (seconds) into test shapes with a dimension of 25×25×3 mm (millimeters). These test shapes were cooled down to room temperature (23° C.) and used for the subsequently described expansion test experiments.

2. Testing of Compositions 2.1 Volume Expansion and Stability Under Humid Conditions For the volume expansion tests, the samples of thermally expandable compositions were baked during 30 min in an oven at a temperature of 205° C.

Expansions were quantified for each sample by measuring the density before and after expansion. The densities were determined according to DIN EN ISO 1183:2019 using the water immersion method (Archimedes principle) in deionized water and a precision balance to measure the mass.

In a first set of experiments, the initial volume expansions of the samples were measured directly after production. The magnitude of initial expansion before water treatment (in % based on the original volume prior to expansion) are shown in Table 5.

In a second set of experiments, the samples of the thermally expandable compositions were stored immersed in water at room temperature and tested daily for volume expansion. As long as the volume expansion exceeded the target range>1,500%, the samples were considered stable. In table 5, the time periods during which the samples remain stable are given.

TABLE 5

Volume expansion and stability under wet conditions of selected samples of thermally expandable compositions.

| Composition | Expansion | Stability |
|---|---|---|
| C-R1 | 2'200% | 5 days |
| C-R2 | 650% | — |
| C-1 | 1'950% | >3 weeks# |

#After 3 weeks, the volume expansion still was 1'700%. No measurements have been taken afterwards.

As evident from table 5, similar to the conventional thermally expandable composition C-R1, the inventive thermally expandable composition C-1 shows an expansion well above the target range of >1,500%. However, the expansion of reference composition C-R2, which was produced with the non-inventive master-batch R3 having an MFI above the claimed range (>8 g/10 min), clearly is below the target range.

Further tests with thermally expandable composition which were based on master-batches having an MFI<0.1 g/10 min (not shown) could not be expanded to more than 650%, probably due to a too high degree of cross-linking.

With regard to stability, it is evident, that the inventive thermally expandable composition C-1 has a much better resistance to humidity or water, respectively, when compared with the conventional composition C-R1.

2.2 Rheological Properties

In order to determine rheological properties, the storage modulus (G') and the loss modulus (G") of selected samples have been determined with an ARES rotational rheometer (TA Instruments, New Castle, USA) 14 days after production.

Figure 2:
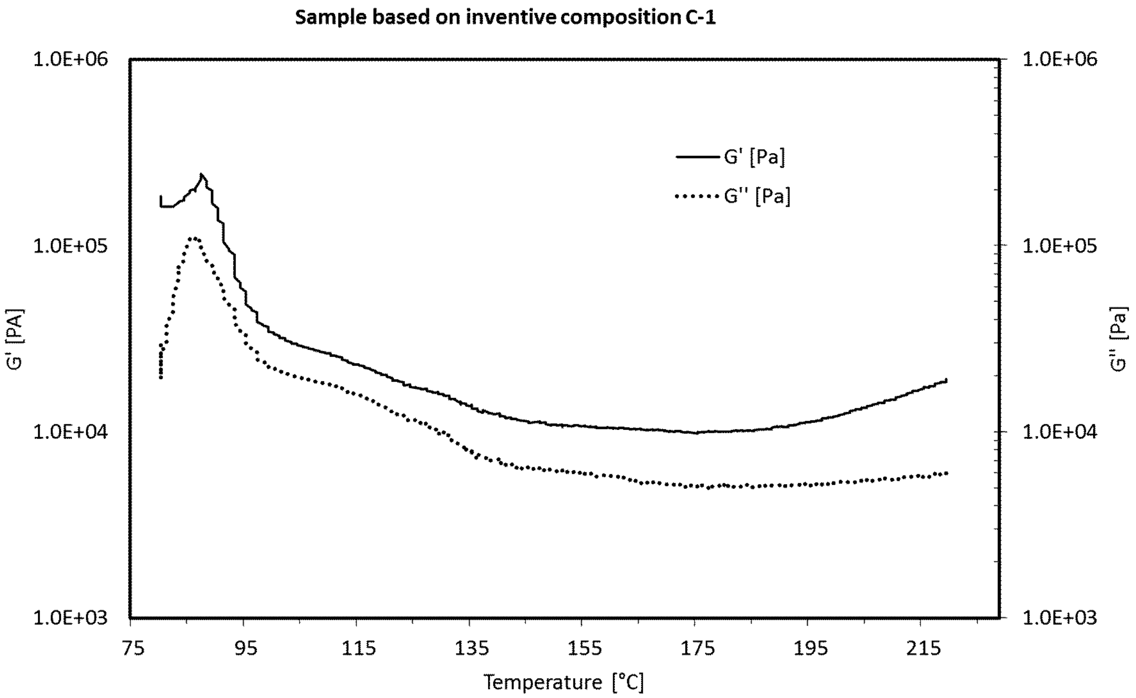
FIG. 2 shows the storage modulus (G') and the loss modulus (G") of a sample made from an inventive thermally expandable composition as a function of temperature.

FIG. 1 shows the storage modulus (G') and the loss modulus (G") of the sample made from the conventional composition C-R1 as a function of temperature whereas FIG. 2 show the storage modulus (G') and the loss modulus (G") of the sample made from the inventive thermally expandable composition C-1.

Interestingly, with increasing temperature, the sample based on the inventive composition C-1 (FIG. 2) becomes softer but it does not melt (no crossing of G' and G"). In contrast, at temperatures of about 95° C., the reference sample based on the conventional composition C-R1 (FIG. 1) starts melting (crossing of the curves if G' and G"). Thus, with regard to sagging during curing, the sample based on the inventive composition C-1 is clearly beneficial.

2.3 Adhesion Tests

Adhesion properties of selected samples were analyzed on metal as well as on nylon panels with a single lap shear test.

Metal Panels

Metal panels measuring 4"×6" from cold rolled steel (CRS) and hot dipped galvanized (HDG) metal were cut on a metal cutter in an oven room. Half of the total metal panels were oiled using 60 μL of oil (Errocote® 61-MAL-HCl-1) for each metal panel and allowed to dwell for one hour before wiping off the excess. These panels were then used to make oiled sandwich panels.

Samples of C-R1 or C-1, respectively, were cut into 1"×3"×2.5 mm strips and placed on the metal panels.

In order to produce the sandwich structures, a spacer (length of the spacer: 10 mm; height if the spacer: 5 mm) was placed at both ends of the sample bearing panel, then another panel was placed on top of the spacers. These panels were held together with binder clips and then placed in an oven for 30 minutes at 190° C. Once baking was finished, the panels were removed and allowed to cool for one day at room temperature before evaluation.

Evaluating the sandwiched panels was effected be simply pulling the metal panels of a sandwich structure in opposite directions.

Both, sandwich panels containing the expanded C-R1 based sample material as well as the expanded C-1 based sample materials (with and without oil) adhered well. Failure exhibited was cohesive failure.

Nylon Panels

Panels of nylon (3 types: (i) normal nylon, (ii) nylon containing 35% glass fibers and (iii) nylon containing 15% carbon fibers) were cut into 4"×6" panels and then aged for either (a) 1 week at a temperature of 50° C. at a humidity of 95% or (b) for 1 week at a temperature of 40° C. at a standard humidity. A further set of panels was also produced whereby water was sprayed directly onto the nylon panels for 30 seconds in a swirling pattern at the center of the panel.

Once aged or pre-treated with water, respectively, sample material based on C-R1 or C-1, respectively, was applied onto the nylon panels. Subsequently, the panels were placed in electric oven for 30 minutes at 190° C. Afterwards panels were cooled down to room temperature before evaluating the adhesion properties Both, panels containing the expanded C-R1 based sample material as well as the expanded C-1 based sample materials adhered well on all types of nylon panels and independently of the ageing or the pre-treatment. Failure exhibited was cohesive failure.

2.4 Buckling Test

Additionally, buckling properties of selected samples were evaluated. Thereby, samples based on C-R1 or C-1, respectively, were produced with a thickness of 2.5 mm. Once affixed in the buckling tester, the samples were baked for 20 minutes at a temperature of 170° C.

Both, expanded C-R1 based sample materials as well as expanded C-1 based sample materials, adhered passed the buckling test (no deep buckling observed by visual inspection).

2.5 Emission Tests

Emission tests for acetaldehyde and formaldehyde with samples made from C-R1 based materials as well as C-1 based materials were performed according to standard VDA 276 "Determination of organic emissions from components for vehicle interiors with a 1 $m^3$ test chamber" (VDA—Verband Deutscher Automobilindustrie, December 2005). Results are given in table 6.

TABLE 6

Emission of acetaldehyde and formaldehyde.

| Composition | Formaldehyde [μg/$m^3$] | Acetaldehyde [μg/$m^3$] |
|---|---|---|
| C-R1 | 7.8 | 87.1 |
| C-1 | 0.2 | 30.1 |

Thus, with C-1 based materials (according to the invention), both the emission of acetaldehyde and formaldehyde is significantly lower when compared to conventional C-R1 based materials.

The invention claimed is:

1. A product obtained by reacting, a mixture comprising:

(a) at least one polymer P, cross-linkable by peroxide, and (b) at least one coagent, and (c) at least one peroxide PE, wherein a weight ratio of the at least one polymer P to the active peroxide content of the at least one peroxide PE is between 50 and 200, wherein the mixture is reacted to form a reacted product PR, the mixture being reacted such that the at least one polymer P is pre-crosslinked and the reacted product PR has an average melt flow index (MFI) of between 0.1 and 8 g/10 min, and wherein the reacted product PR is formed from the mixture essentially in the absence of a blowing agent.

2. The product according to claim 1, wherein the at least one polymer P comprises more than 70 wt.-% of ethylene-vinyl acetate (EVA), based on the total amount of the Polymer P.

3. The product according to claim 1, wherein the at least one coagent comprises a polyfunctional acrylate A with an acrylate functionality of at least 2 or 3, in an amount of more than 70 wt.-%, based on the total amount of the polyfunctional acrylate A.

4. The product according to claim 1 wherein in the reacted product PR, based on the initial amount of peroxide PE initially present in the mixture for obtaining reacted product PR, a content of the at least one peroxide PE in unreacted state is between 0 and 5 wt.-%.

5. The product according to claim 1 wherein, based on the total weight of the mixture, the mixture for obtaining the reacted product PR comprises between 0.05-10 wt. %, of the at least one peroxide PE.

6. A thermally expandable composition comprising the reacted product PR as defined in claim 1 and (d) at least one blowing agent.

7. The thermally expandable composition according to claim 6 wherein the at least one blowing agent is selected from azo compounds, hydrazides, nitroso compounds, carbamates, and/or carbazides.

8. The thermally expandable composition according to claim 6 wherein an amount of the at least one blowing agent is between 2 and 15 wt.-%, based on the total weight of the thermally expandable composition.

9. A baffle and/or reinforcement element for open and/or hollow structures, wherein the element comprises a thermally expandable composition according to claim 6.

10. A method for obtaining a product, comprising the step:

i) reacting a mixture comprising:

(a) at least one polymer P, cross-linkable by peroxide, and (b) at least one coagent, and (c) at least one peroxide PE, wherein a weight ratio of the at least one polymer P to the active peroxide content of the at least one peroxide PE is between 50 and 200, wherein the reacting the mixture forms a reacted product PR, the reacting being done such that the at least one polymer P is pre-crosslinked and the reacted product has an average melt flow index (MFI) of between 0.1 and 8 g/10 min, and wherein the reacting the mixture is done essentially in the absence of a blowing agent.

11. A method for producing a thermally expandable composition comprising the steps of:

i) obtaining the reacted product PR according to the method of claim 10, and ii) mixing the reacted product PR obtained in step i) with at least one blowing agent and optionally extruding.

12. The method according to claim 11, wherein step i) is effected at a higher temperature than step ii).

13. A method for producing a thermally expanded composition comprising the steps of:

i) obtaining the reacted product PR according to the method of claim 10, ii) obtaining a thermally expandable composition by mixing the reacted product PR with at least one blowing agent and optionally extruding, and iii) expanding the thermally expandable composition obtained in step ii) by a heat treatment.

* * * * *